May 16, 1961  W. H. STOUT ET AL  2,984,253
PRESSURE FLUID ACTUATED VALVE MECHANISM
Filed July 11, 1958

William H. Stout
Paul H. Raumaker
INVENTORS

BY Ramsey and Kolisch
Attys.

United States Patent Office 2,984,253
Patented May 16, 1961

2,984,253

PRESSURE FLUID ACTUATED VALVE MECHANISM

William H. Stout, 223 N. Jessup St., Portland 17, Oreg., and Paul H. Raumaker, Portland, Oreg.; said Raumaker assignor to said Stout Filed July 11, 1958, Ser. No. 747,968

3 Claims. (Cl. 137—119)

This invention relates to valve mechanisms, and more particularly to an improved construction for a pressure fluid actuated valve mechanism for a conduit section wherein the valve mechanism is actuated by pressure changes in the fluid flowing in the conduit section.

In a co-pending application having Serial No. 603,703, entitled "Pressure Responsive Control Device," filed August 13, 1956, now abandoned, there is disclosed an irrigation system for watering in sequence successive areas of a ground surface. In the system, plural distribution outlets or stands arranged along a conduit section are placed one after another in fluid communication with the fluid flowing in the conduit section by means of a pressure responsive control device associated with each of the stands which is actuated by variations in pressure in the fluid flow through the conduit. Specifically, this invention is an improvement in the construction of the fluid expansion mechanism for control valves of the type illustrated in the aforementioned co-pending application.

In the earlier filed application, there is described a valve part mounted in a conduit section which has valve closure means at each end thereof, each movable into registry with a valve port or orifice to close the same. The valve part further comprises a fluid operated expansion mechanism which is enlarged when pressure fluid is introduced into the conduit section mounting the valve part. Expansion of the mechanism cocks a spring device employed to urge the valve part from a position wherein one of the valve ports is closed to a position wherein the valve closure means at the other end of the valve part closes the other of the valve ports. While the introduction of fluid under pressure into the conduit segment cocks the spring device, movement of the valve part does not occur until a subsequent momentary interruption in the pressure of the fluid occurs. The expansion mechanism is also constructed to return to its original contracted condition upon a decrease in the pressure of the fluid over a relatively long period of time. In the organization described, it is important that the expansion mechanism at all times be free to expand under the urging of fluid under pressure, and further, that the mechanism consistently return to its original state in the absence of fluid under pressure at a uniform rate of speed. If the expansion mechanism fails to expand, or if the expansion mechanism is not fully expanded with fluid so that premature contraction takes place upon a decrease in fluid pressure, faulty operation results.

The expansion mechanism described above is connected to the fluid flowing in the conduit by a constricted metering passage or channel. A metering channel passing the fluid distributed by the conduit system has been found to be disadvantageous, in that the channel is susceptible to clogging by foreign matter carried in the fluid, e.g. algae. Clogging prevents the device from performing properly. To eliminate this difficulty, the invention contemplates incorporating with the expansion mechanism a captive fluid construction, wherein the fluid producing expansion of the mechanism is pure and is maintained in an enclosed chamber and thus kept free of foreign matter and impurities.

The captive fluid construction is characterized by a number of novel features. Specifically, a pair of bell-shaped inflatable-deflatable container members or cups of resilient material are mounted in a cylindrical shell on either side of a divider wall intermediate the ends of the shell and spanning the hollow interior of the shell. The cylindrical shell forms the body of the valve part. A metering channel extending through the divider wall connects the interiors of the two cups, with the cup interiors and channel defining an enclosed chamber. This chamber is filled with a captive fluid in an amount sufficient to inflate only one of the cups.

The shell is closed at one end by an end wall, and at the other end by a piston which bears against the container member or cup facing toward the piston. The shell walls and piston confine the container members and provide support for the container walls so that when fluid is passed from one to the other, they flex in the proper direction.

A port is provided in the cylinder shell which leads to the cavity mounting the container facing away from the piston. Fluid under pressure introduced through the port to this cavity deflates the container mounted in the cavity, causing fluid to flow to the other container and inflation of the other container. The result is movement of the piston bearing on the other container and expansion of the mechanism. The construction assures that the piston is displaced a predetermined amount and at a uniform rate over long periods of time, for given fluid pressure. As a correlary, the expansion mechanism contracts uniformly upon a decrease in the pressure of the pressure fluid.

It is further contemplated that the cups be mounted on either side of the divider wall by a novel construction wherein the cups are positively gripped and prevented from loosening within the shell. Specifically, in a preferred embodiment the shell comprises a pair of shell segments arranged end to end, and the dividing wall takes the form of a transverse wall segment set between adjacent sets of ends of the shell segments. Ridges around the perimeters of the cups are clamped between the edges of the shell segments and the faces of the wall segment. A ring portion integral with the wall segment bounds the peripheral margins of the cups and is used to fasten the various parts together.

The construction of the invention is economical, easy to produce, and free of moving parts which are subject to breakdown.

Other objects and features are obtained by this invention, which is described hereinbelow in conjunction with the accompanying drawings wherein.

Figure 1:
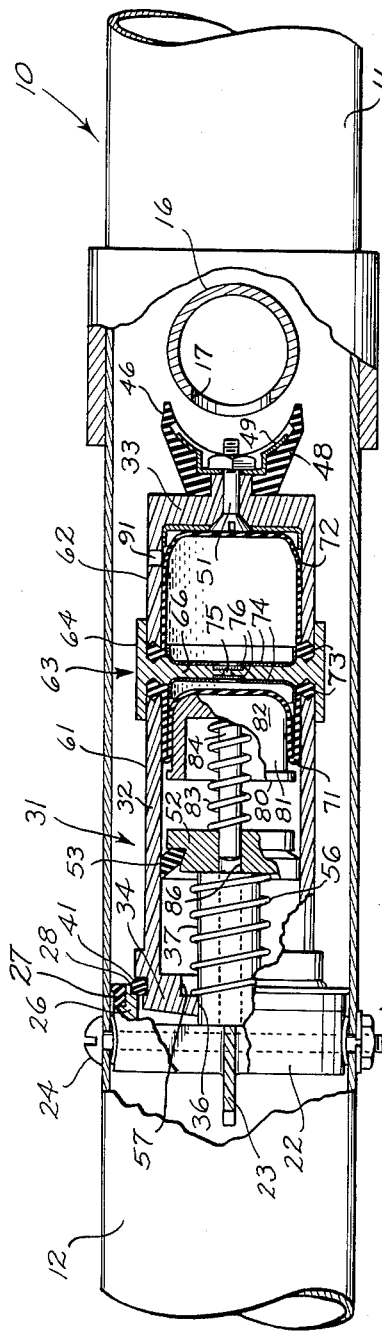
Fig. 1 illustrates a control valve constructed according to this invention, showing the parts of the valve in one position.

Referring now to the drawings, 10 indicates a conduit segment forming part of an irrigation system. In a completed system, the right hand end portion or end portion 11, is connected to a source of water under pressure, and the left hand end portion or end portion 12 connects with an additional length of conduit which forms the remainder of the system. End portion 11 is hereinafter referred to as the "inlet" end portion of the conduit segment, and end portion 12 is hereinafter referred to as the "outlet" end portion of the conduit segment.

Connected to the conduit segment and extending outwardly therefrom near the inlet end portion thereof is a stand pipe 16 of a sprinkler stand or outlet. This stand pipe, which constitutes a branch conduit, in the usual instance has an upper end (the end carried outwardly from the plane of the page in Figs. 1 and 2) equipped with a sprinkler head. The head is not shown as it forms no part of the invention. The stand pipe has a port or orifice 17 formed therein connecting with the interior of conduit segment 10, which provides a path for the flow of fluid from the conduit segment into the stand pipe and thence out the sprinkler head.

At the outlet end portion of the conduit segment there is a valve seat structure indicated generally at 21. This comprises members 22 and 23 joined together and fixed to the conduit system by a nut and bolt assembly 24. (The bolt portion of the assembly passes through an accommodating bore extending along the length of member 22.) Members 22, 23 brace an annular rim portion 26. Rim portion 26 is sealed around its outer periphery to the inner wall of conduit segment 10 by a seal 27. An annular groove 28 is provided around the inner periphery of rim portion 26.

Mounted for reciprocation to and fro within conduit segment 10 is an elongated valve part designated generally at 31. The valve part comprises a cylindrical shell portion 32 closed off at its right hand end by a wall 33, and at its left hand end by a wall 34. Wall 34 has a bore 36 extending along the radial center thereof which slidably mounts a cylindrical projection 37 integral with valve seat structure 21. The projection guides the valve part in its movement within the conduit segment.

Encircling the periphery of the left hand end of the valve part in the vicinity of wall 34 is a seal 41. The seal seats in an appropriate groove extending around the perimeter of the valve part. The seal functions as a closure means at one end of the valve part and is movable into and out of registry with groove 28 to close and open up, respectively, the port defined by rim portion 26 at the outlet end of the conduit segment. The port defined by rim portion 26 constitutes one outlet in the conduit segment, and port 17 accommodating flow to the sprinkler head constitutes a second outlet.

Affixed to end wall 33 at the other end of the valve part is a U-shaped valve head 46. The valve head comprises a flexible rubber portion 48 supported by metal support 49. The entire assembly is affixed to end wall 33 by nut and bolt assembly 51. The valve head is movable into and out of registry with port 17, to close and open the port, respectively. Thus the valve head constitutes closure means at the other end of the valve part.

As described so far, the structure is similar in operation and function to the construction described in the aforementioned co-pending application. The normal or rest position for the valve part, is that illustrated in Fig. 1, wherein seal 41 closes the port at the outlet end of the conduit segment, and valve head 46 is spaced away from port 17.

Fluid pressure actuated expansion mechanism is provided for moving the valve part from the rest position shown in Fig. 1, to a position wherein head 46 closes port 17, and seal 41 is moved away from rim portion 26. The mechanism comprises a pair of springs acting in concert with an expansible chamber. One spring functions to urge the valve part to the closing position of Fig. 1. The other spring, when compressed and thereby cocked, functions to urge the valve part to a position wherein valve head 46 closes port 17. Movement of the valve part 31 does not take place, however, until a fluid pressure reduction occurs in the conduit segment, and the pressure head acting on the valve part body is removed so that the port defined by rim portion 26 may be opened up. The spring which is cocked is stronger than the spring urging the valve part to the closing position of Fig. 1, but can move the part only in the absence of any pressure head acting on the part.

Specifically, cylindrical extension 37 has joined to an end thereof a plunger 52. The plunger is slidable longitudinally of the valve part, and is provided with a seal 53 extending around its perimeter. The seal prevents leakage of any fluid around the plunger. Seated against the left hand face of the plunger is a compression spring 56. Spring 56 has its other end seated in an angular groove 57 formed in wall 34. The plunger, since it is fixed to cylindrical projection 37, is also fixed with respect to conduit segment 10. Thus compression spring 56 operates constantly to urge the valve part to the position shown in Figs. 1 and 2, with seal 41 abutting the walls of groove 28.

Shell portion 32 comprises two shell segments arranged end to end, a left hand shell segment 61 and a right hand shell segment 62, respectively. These are joined together by a member 63 having an outer ring or band portion 64 and a radially extending wall 66 spanning the inner diameter of ring portion 64. Wall 66 constitutes a divider wall in the device, dividing shell 32 at a point intermediate its ends.

Gripped between the end edges of the shell segments and the opposite faces of wall 66 are a pair of inflatable-deflatable container elements or cups 71, 72. These have a configuration resembling a thimble, and are made of rubber or similar flexible material. Around the lip defining a mouth at the open end of each container member is a ridge 73 of hexagonal cross-section. The configuration of each ridge assures that each container member is positively gripped between the end edge of a shell segment and a face of wall 66. Retainer discs 74 mounted with the container members provide rigid support opening up the mouths of the container members. The shell segments and member 63 are made fast as by the use of an adhesive applied in the interfacial area between band 64 and the outer surfaces of the shell segments.

Extending through wall 66 and interconnecting the interiors of the cup shaped containers is a metering passage or channel 75. The channel has a relatively small diameter, which prevents the fast flow of fluid through the channel. Screens 76 may be mounted over the open ends of channel 75 for the purpose of preventing clogging of the same, although if the fluid passing therethrough is pure, there is no need for the screens.

Container 72 in the inflated condition of Fig. 1 substantially fills the cavity defined by the opposed faces of walls 66, 33. Member 71 is compressed within the space bounded by the opposite face of wall 66 and the pressure face of a piston 81.

Piston element 81 has a cylindrical head portion 82 of slightly smaller diameter than the inner diameter of shell 32, and a seating flange 80 projecting radially outwardly from one end thereof. The piston is urged against container member 71 by a compression spring 83. One end of spring 83 seats on plunger 52, and the other end seats on piston 81. The compression spring is shown encircling a stud guide 84 integral with the piston element and sliding in an accommodating bore 86 formed in projection 37. The piston element is movable between the positions shown in Fig. 1, with its pressure face tightly against and deflating container member 71, and the position shown in Fig. 2 wherein seating flange 80 abuts the plunger element.

The chamber defined by the walls of the two cupped container members and the metering channel contains a fluid such as pure water. The water is present in amounts not sufficient completely to fill the chamber if both container members are inflated. Instead, there is sufficient water only substantially to fill one of the container members. Water passes from one container member to the other through the metering channel thereby causing inflation of one container member and deflation of the other container member.

Extending through the wall of shell segment 62 is a relatively large bore 91. This bore is of such size that there is little chance of its being clogged by algae or other foreign material. Water introduced under pressure to the conduit segment flows through bore 91 into the cavity holding the cup or container 72. The pressure of the water on cup 91 causes it to deflate with the left cup inflating gradually at a rate determined by the flow of captive water through the metering channel.

In operation, before irrigation water in the system, the parts of the device occupy the positions of Fig. 1. Water under pressure subsequently introduced to the inlet end of the conduit segment flows through port 17 and thence out a sprinkling stand. The port at the outlet end of the conduit segment is closed.

Figure 2:
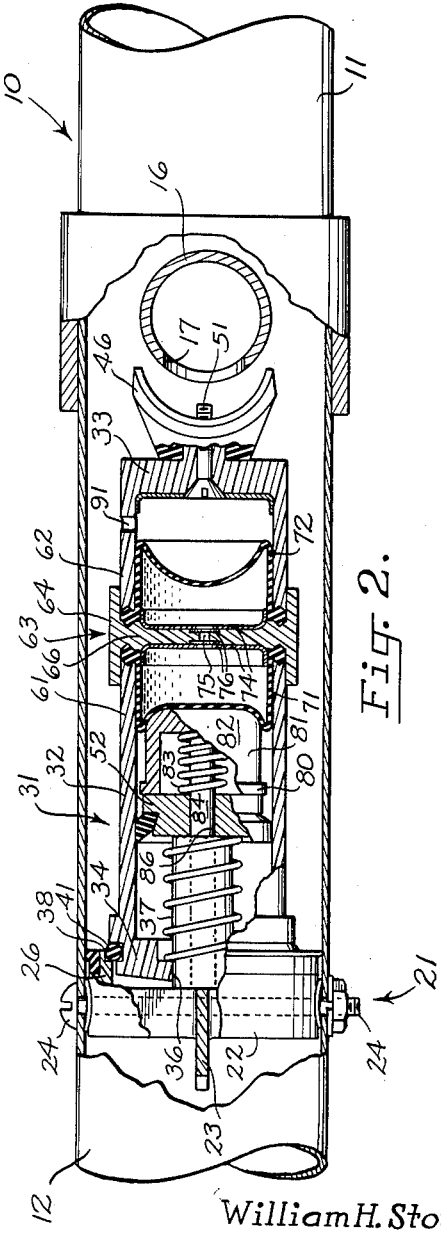
Fig. 2 illustrates the control valve in Fig. 1 with the parts of the valve occupying a different position.

With the pressure of water under pressure in the conduit segment, cup 72 deflates, and cup 71 inflates with captive water. This causes piston 81 to move to the left in Fig. 1 against the pressure of spring 83. Plunger 52 and the walls of shell segment 61 cover cup 71 to shut off the cup from pressure fluid flowing in the conduit segment. Air or other fluid between the plunger and piston 81 is permitted an escape to the atmosphere through bore 86 and the bore mounting the bolt position of assembly 24. (The two bores intersect in seating structure 21.) When the condition shown in Fig. 2 is reached, spring 83 is cocked and ready to move the valve part.

A subsequent reduction in the pressure of water allows spring 83 to move part 31 so that head 46 covers port 17 and seal 41 moves away from rim 26. When the pressure of water is reinstated, the valve part remains stationary as the port at the outlet of the conduit segment is opened and there is no pressure head acting on the valve part. If the pressure reduction is only momentary, the cups remain substantially in the same state they occupied immediately before the pressure reduction.

A pressure reduction over a long period of time enables cup 71 to discharge its contents into cup 72, with expansion of spring 83. The parts then return to the condition illustrated in Fig. 1, which constitutes the contracted condition for the device.

The construction described has a number of advantages. The metering channel is free of moving parts, and regulation is by a captive liquid kept free from impurities. The container cups are guided during their inflation and deflation by the walls of the shell segments, and for a given pressure, the rate of inflation and deflation occurring in the parts is constant over long periods of time.

The reduced diameter of head 82 enables the walls of left hand cup 71 to fold around the head into the space between the head and the cylinder shell. Preferably the parts are assembled so that in the expanded condition of Fig. 2, cup 71 is not fully inflated, but contains a fold. The presence always of the fold promotes better flexing of the cup during inflation and deflation.

While a particular embodiment has been described, it is appreciated that the parts may be changed and/or rearranged without departing from the inventive scope of this invention. It is desired to cover all modifications and variations which would be apparent to one skilled in the art, and that come within the scope of the appended claims.

It is claimed and desired to secure by Letters Patent:

1. In the combination of conduit means defining a fluid passage for the flow of fluid and a pair of valve ports spaced one from the other along the length of said passage, and a valve part mounted in said passage between said ports having valve closure means at each end thereof, each for closing one of said valve ports, one of said ports controlling fluid flow through said conduit and the other of said ports controlling fluid flow to a branch conduit, the improvement comprising bias means urging said valve part in one direction to close said one port, and fluid pressure actuated mechanism carried by said valve part for moving said valve part in the opposite direction to close the other of said ports, the latter mechanism comprising a wall fixed to said valve part having a metering channel extending therethrough, a pair of inflatable-deflatable container members of flexible material and with wall portions defining hollow interiors joined to said wall, one on each side of said wall, with said metering channel connecting the hollow interiors of said container members, said container members and metering channel defining an enclosed chamber, a captive fluid contained in said chamber in an amount not sufficient completely to inflate both of said container members, cover means joined to said wall encircling and closing off one of said container members from fluid flowing in said passage, the other of said container members being exposed to fluid flowing in said passage, and spring means carried by said valve part energized by inflation of said one container, said spring means when energized urging said valve part in said opposite direction.

2. In combination with conduit means defining a fluid passage for the flow of fluid having an inlet and a pair of outlets for said fluid passage, a shiftable valve part mounted in said fluid passage having a pair of closure portions, one for closing each of said outlets, said valve part being shiftable between one position wherein one outlet is closed and the other is open and another position wherein said other outlet is closed and said one is opened, means operable to bias said valve part to said one position, and fluid pressure actuated mechanism adjusted to an energized state by the presence of fluid under pressure in said fluid passage operatively connected to said valve part for urging said valve part from said one position toward said other position when in an energized state, said fluid pressure actuated mechanism comprising a pair of spaced inflatable-deflatable hollow container portions of flexible material and a constricted metering channel connecting the interiors of said container portions, captive fluid contained in said container portions in an amount not sufficient completely to inflate both and operable to inflate one on deflation of the other, cover means covering one of said container portions and closing off the exterior of the container portion from fluid flowing in said fluid passage, the other of said container portions being exposed to fluid in said passage, and spring means for said one container portion operable to urge deflation of said one container portion and inflation of said other container portion, said fluid pressure actuated mechanism being in an energized state when said other container portion is deflated and said one container portion is inflated against the urging of said spring means.

3. In combination with conduit means defining a fluid passage for the flow of fluid having an inlet and a pair of outlets for said fluid passage, a shiftable valve part mounted in said passage having a pair of closure portions, one for closing each of said outlets, said valve part being shiftable between one position wherein one outlet is closed and the other outlet is open and another position wherein said other outlet is closed and said one is opened, means operable to bias said valve part to said one position, and fluid pressure actuated mechanism carried by the valve part thus to be shiftable therewith for urging said valve part from said one position toward said other position when adjusted to an energized state by the presence of fluid under pressure in said fluid passage, said fluid pressure actuated mechanism comprising a pair of opposed inflatable-deflatable hollow container portions of flexible material and a constricted metering channel joining the interiors of said container portions, captive fluid contained within said container portions in an amount not sufficient completely to inflate both and operable to inflate one on deflation of the other, cover means covering one of the container portions and closing it off from fluid contained within said fluid passage, the other of said container portions being exposed to fluid in said fluid passage, and spring means mounted on said valve part operatively connected to said one container portion for urging deflation of the same, said spring means being energized by inflation of said one container member and deflation of said other container member when fluid under pressure is present in said conduit means, said pressure fluid actuated mechanism being adjusted to an energized state by energizing of said spring means.

References Cited in the file of this patent

UNITED STATES PATENTS

| | | |
|---|---|---|
| 1,272,404 | Elder | July 16, 1918 |
| 2,552,479 | Copping | May 8, 1951 |
| 2,580,433 | Kain | Jan. 1, 1952 |
| 2,921,629 | Stout | Jan. 19, 1960 |